UNITED STATES PATENT OFFICE.

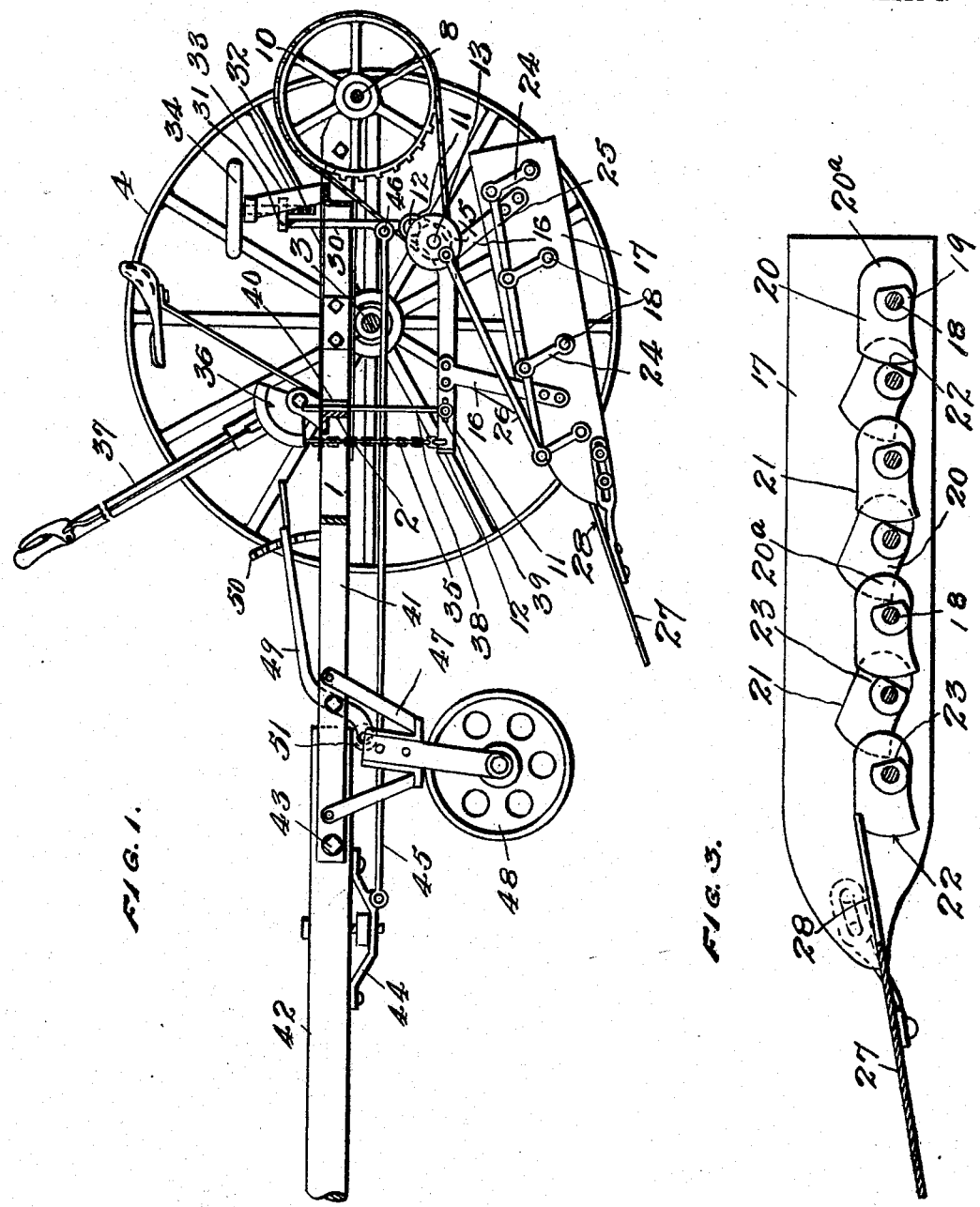

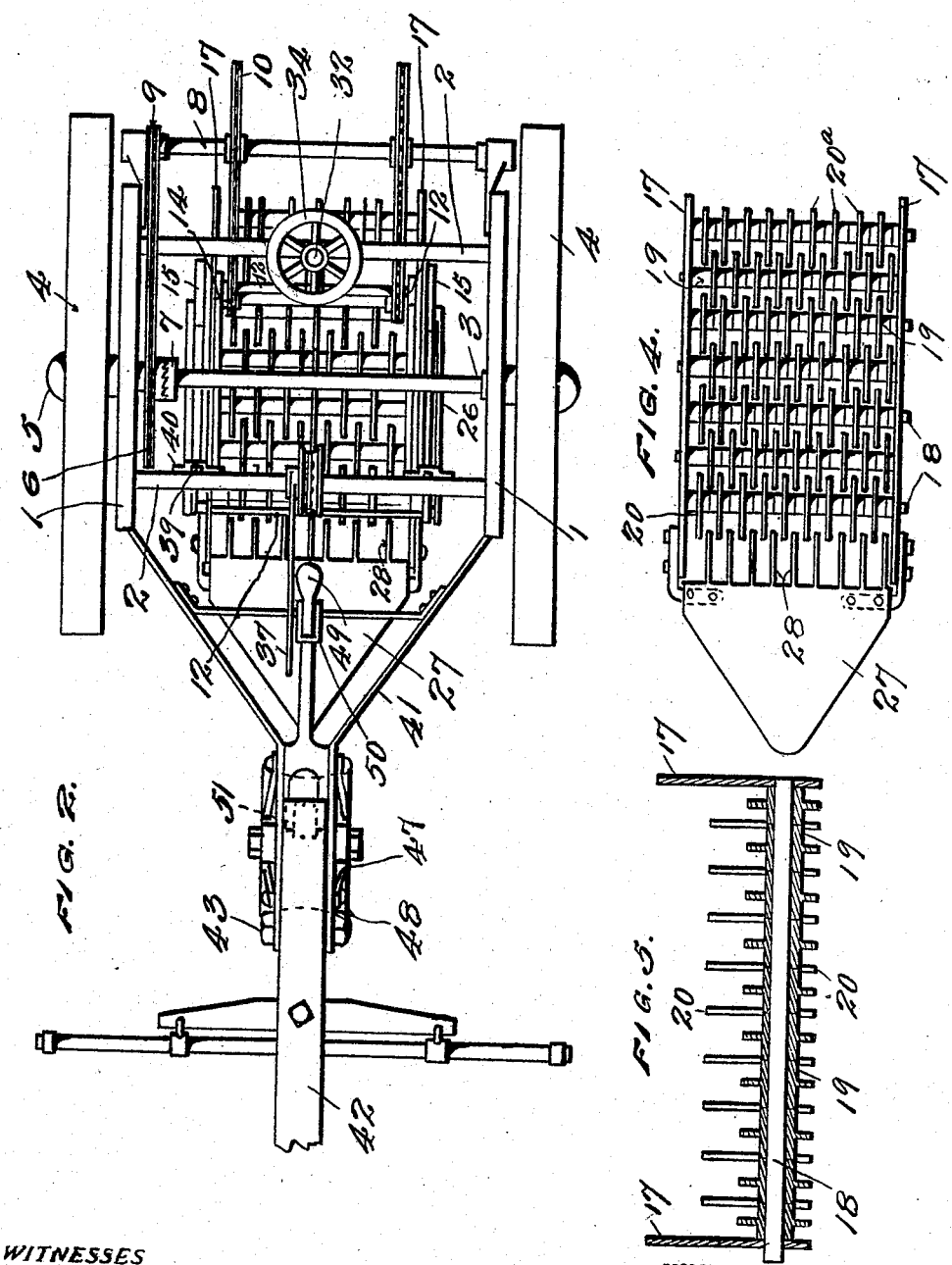

ALFRED W. COOKSON, OF HORNELL, NEW YORK.

POTATO-DIGGER.

937,423.　　　　　Specification of Letters Patent.　　Patented Oct. 19, 1909.

Application filed April 22, 1908.　Serial No. 428,680.

*To all whom it may concern:*

Be it known that I, ALFRED W. COOKSON, a citizen of the United States, and resident of Hornell, in the county of Steuben and State of New York, have invented certain new and useful Improvements in Potato-Diggers, of which the following is a specification.

The invention comprises a complete agricultural implement for use in digging and separating potatoes from earth. Some features of the invention can be used in agricultural implements for other purposes.

An important feature of the invention is a novel separator. This is a screen which consists of a plurality of rows of oscillating blades constructed and arranged so that their movement carries the mass of earth and potatoes from the front to the rear of the separator. The blades also cause a complete tumbling of the potatoes which roll over and over as they move over the separator so that they are completely freed from earth. These sets of blades are employed in connection with side boards which direct the material in its passage over the blades and a plow or shovel at the front which initially elevates the mass and delivers it to the separator proper.

My invention further provides means for carrying the separator with its shovel at a slight angle to the horizontal so that the earth and potatoes may be easily elevated and forced onto the separator. Means are also provided for adjusting either or both ends of the separator in relation to the ground. A novel draft appliance especially adapted to use in this form of separator, but which may be otherwise employed, is provided and novel means are introduced for raising the front wheel from the ground to permit turning the implement and for returning the wheel to normal position.

The accompanying drawing illustrates an exemplifying structure embodying the invention. This structure will now be particularly described. It is to be understood, however, that the invention is not limited to any specific form of construction but that variations may be made within the ability of persons skilled in the art.

Figure 1 is a side elevation, Fig. 2, a plan, Fig. 3, is a longitudinal section through the separator, Fig. 4 is a plan of the separator, and Fig. 5 is a detail sectional view through one of the separator sleeves.

The frame consists of side members 1 and cross pieces 2 which may be of angle iron. The axle 3 is suitably journaled on the side members of the frame and carries wheels 4 which are connected to the axle by ratchet mechanism carried within the hubs 5 and arranged so that either wheel will rotate the axle when the vehicle moves forward. The details of the ratchet mechanism are nonessential and will not be especially described. Evidently, the ratchet mechanism serves in place of differential mechanism, causing the outside wheel to rotate the axle when the implement takes a curve. The axle carries a free sprocket 6 which may be disconnected and connected to rotate with the axle by a clutch 7. At the rear the frame carries a counter-shaft 8 provided with a small sprocket 9 connected with sprocket 6 by a chain. The counter-shaft also has large sprockets 10.

Below the main frame is slung a sub-frame consisting of side bars 11 and cross bars 12. The side members of the sub-frame are extended rearwardly and upwardly and each carries in a suitable bearing a short shaft 13. Each of these shafts carries a small sprocket 14 connected to the adjacent sprockets 10 on the counter-shaft by a chain, and a crank 15 or its equivalent. The cranks on the two short shafts are arranged at an angle of 180 degrees.

Below the sub-frame and connected to it by arms 16 is the separator, the mechanism of which is supported by the side boards 17. The separator shafts 18 of any suitable number are journaled transversely in the side boards and the ends of alternate shafts commencing at the front project through one of the side boards while the ends of the other shafts protrude through the other side board. Connected to move with each shaft is a sleeve 19 on which the separator blades 20 are cast. The blades may, of course, be separately formed or connected together and mounted in any suitable manner. The blades on each sleeve are arranged to fit in between those on the adjoining sleeve. The upper faces 21 of the blades are straight and their ends 22 are arc-shaped, the curve being struck from the shaft centers. The blades also extend rearwardly as at 20ª a suitable distance. Intermediate the blades the sleeves are slightly cut away as at 23 so that the ends 22 of the adjoining blades will clear the sleeve and yet keep close to it in their movement. It will be noted that when the forward ends of the blades are in their uppermost position their lower ends are close to sleeves 19 so that any hard substance such as a stone is prevented from getting between the blades and sleeves and causing stoppage or damage to the machine. The shape and arrangement of the blades may, of course, be varied greatly. I have shown and described the best form which we have up to the present time devised. The surface formed by the group of blades is sometimes referred to as a screen.

The projecting ends of shafts 18 are provided with crank arms 24 and all the crank arms on each side of the separator are connected together by one of links 25. The link or one of the crank arms, conveniently the forward one, on each side of the separator is connected by a pitman 26 to the crank 15 on short shaft 13 on the same side of the machine.

The shovel 27 is carried in front of the side boards and connected to them adjustably, and is provided with stationary fingers or blades 28 extending backward between the blades of the first separator sleeve.

As the implement is moved forward the ratchets carried in the wheel hubs drive axle 3 and clutch 7 being engaged, through sprockets 6 and 9 and their chain the counter-shaft 8 is rotated. The counter-shaft through sprockets 10 and 14 and their chains drives short shafts 13; crank 15 on each short shaft reciprocates its pitman 26; the pitman reciprocates the corresponding link 25; the link moves all of its connected crank arms 24 and they in turn rock the separator sleeves, moving the blades up and down. Fig. 3 shows the blades of one set of sleeves in their lowest position and those of the other set in their uppermost position. The blades move oppositely because of the opposite arrangement of cranks 15. At the same time the movement of the implement forces earth containing potatoes up on the plow 27 and backward between the side boards, the mass being supported by stationary fingers 28 until it encounters the forward separator blades. The material is now taken up by the separator proper. The movement of the blades, the front ends of which alternately rise and fall agitates the material at the same time, rolling it over and over toward the rear of the separator. This tumbling and rolling movement thoroughly frees the earth from the potatoes, the earth dropping through to the ground and the potatoes continuing to the rear of the separator where they fall to the ground. The separator may be arranged so that bags or boxes may be carried at its rear end and the potatoes delivered into these receptacles.

It is desirable to make the position of the separator adjustable. To this end the sub-frame 11 is supported at its rear by a post 30 pivoted to the center of rear cross-bar 12. The post passes through a rigid sleeve carried by the main frame and at its upper end is provided with an extension 31, screw-threaded to form a nut engaged by screw 32 supported in a bracket 33 carried by the main frame. A hand wheel 34 serves to rotate the screw and thus raise or lower the rear end of the sub-frame. To the center of the forward cross bar 12 a chain 35 is connected. The upper end of the chain passes around a sector 36 pivotally mounted on the main frame. A lever 37 connected to move with the sector serves to raise or lower the front end of the sub-frame. The sub-frame also carries rods 38 secured to it by pin and slot connections 39. The rods pass at their upper ends through sockets 40 secured to cross bar 2 of the main frame. The function of rods 38 is to guide the sub-frame in its adjustment and to hold it in proper relation to the main frame. The depth and angle of the shovel and separator are varied by raising and lowering the front and rear ends. The separator may be adjusted by other means.

With the particular form of mechanism described, the reaction of the separator and plow would be entirely taken up by post 30 and its socket on the main frame. To relieve the socket of a part of this duty special draft rigging is employed which will now be described.

The main frame is provided with forward extensions 41 to which the pole 42 is pivoted by means of a bolt 43. The weight of the implement is thus kept off of the pole. The whiffle-trees are carried by a bracket 44 on the pole and conveniently to the same bracket, but, in any event, to the pole, is pivoted the forward end of a link 45, the rear end of which is pivoted at 46 to post 30 below its socket. This link takes up directly a part of the pull of the post caused by resistance of the plow to movement through the ground. The frame at its forward end is provided with brackets 47 in which the front wheel 48 is adjustably mounted. A lever 49 moving over a notched segment 50 carries a roller 51 which engages the under side of the rear end of the pole. By depressing the end of the lever the roller is raised, forcing the end of the pole upward in relation to the frame and raising the wheel from the ground so that the implement can be readily turned. To drop the wheel the lever is released from the ratchet and permitted to rise, whereupon the rear end of the pole and the front end of the frame drop until the wheel rests on the ground. The face of the front wheel is concave to conform to the shape of the rows.

I claim:

1. In a separator, the combination of a frame, a plurality of parallel shafts therein, a plurality of blades on each shaft, and means for oscillating the shafts.

2. In a separator, the combination of a frame, a plurality of parallel shafts, blades on each shaft, and means for oscillating the shafts so that adjoining shafts move in opposite directions.

3. In a separator the combination of a frame, a plurality of parallel shafts therein, a plurality of blades on each shaft, the blades on one shaft extending between the blades on the next shaft, each blade comprising a forward extending member having a substantially flat upper edge, and means for rocking the shafts so that adjoining shafts move in opposite directions.

4. In a separator, the combination of a frame, a plurality of parallel shafts therein, a plurality of blades on each shaft, the blades on one shaft extending between the blades on the next shaft, each blade comprising a forward extending member having a substantially flat upper edge, and an arc-shaped end adjacent to a shaft in front, the shafts intermediate the blades being shaped to accommodate the forward edges of the blades on the next rearward shaft, and means for rocking the shafts so that adjoining shafts move in opposite directions.

5. The combination of side-boards, a shovel carried at the front end of the boards, a plurality of parallel shafts between the boards back of the shovel, a plurality of blades on each shaft, the blades of one shaft being arranged between the blades on the adjoining shafts, a crank arm on each shaft and link connections between the crank arms and driving means by which the shafts are oscillated so that each shaft moves in the opposite direction to the adjoining shafts.

6. In a potato digger, the combination of a main-frame, wheels and a separator frame suspended from the main frame, comprising side-boards, a shovel carried at the front end thereof and parallel shafts between the boards, a plurality of blades on each shaft, a crank arm on the first and each alternate shaft at one side of the frame, a crank on the second and each alternate shaft on the other side of the frame, a link connecting each set of crank arms, cranks driven by the wheels and pitmen connecting the cranks with said crank arms, the parts being constructed and arranged so that each shaft is oscillated in an opposite direction to that of the adjoining shafts.

ALFRED W. COOKSON.

Witnesses:
J. R. SAUNDERS,
C. V. MULLIGAN.